United States Patent [19]

Treviño

[11] Patent Number: 4,714,597

[45] Date of Patent: Dec. 22, 1987

[54] CORROSION INHIBITOR FOR CO₂ ABSORPTION PROCESS USING ALKANOLAMINES

[75] Inventor: Juan A. V. Treviño, San Nicolas de los Garza, Mexico

[73] Assignee: Hylsa, S.A., Monterrey, Mexico

[21] Appl. No.: 879,059

[22] Filed: Jun. 26, 1986

[51] Int. Cl.⁴ .................. C01B 17/16; C01B 31/20
[52] U.S. Cl. ........................ 423/228; 252/389.52; 252/389.53; 422/13; 423/229
[58] Field of Search .............. 423/229, 228, DIG. 8; 252/389.53, 389.52; 422/17, 13

[56] References Cited

U.S. PATENT DOCUMENTS

| | | | |
|---|---|---|---|
| 1,989,004 | 1/1935 | Fife ............................ | 423/228 |
| 2,377,966 | 6/1945 | Reed ........................... | 23/150 |
| 3,923,954 | 12/1975 | Petrey, Jr. et al. ........... | 423/229 |
| 3,943,227 | 3/1976 | Shutze et al. ................ | 423/229 |
| 4,089,651 | 5/1978 | Scott ........................... | 21/2 |
| 4,143,119 | 3/1979 | Asperger et al. ............. | 252/389.53 |
| 4,428,772 | 1/1984 | Dominguez-Ahedo et al. | 75/91 |
| 4,431,563 | 2/1984 | Krawczyk et al. ........... | 423/229 |

Primary Examiner—Gregory A. Heller
Assistant Examiner—Lori S. Freeman
Attorney, Agent, or Firm—A. Thomas S. Safford

[57] ABSTRACT

Brass, bronze and other mixture of copper and zinc use used to treat alkanolamine solutions used in systems for separating CO₂ from gaseous mixtures to give enhanced protection against ferrous metal corrosion.

8 Claims, 1 Drawing Figure

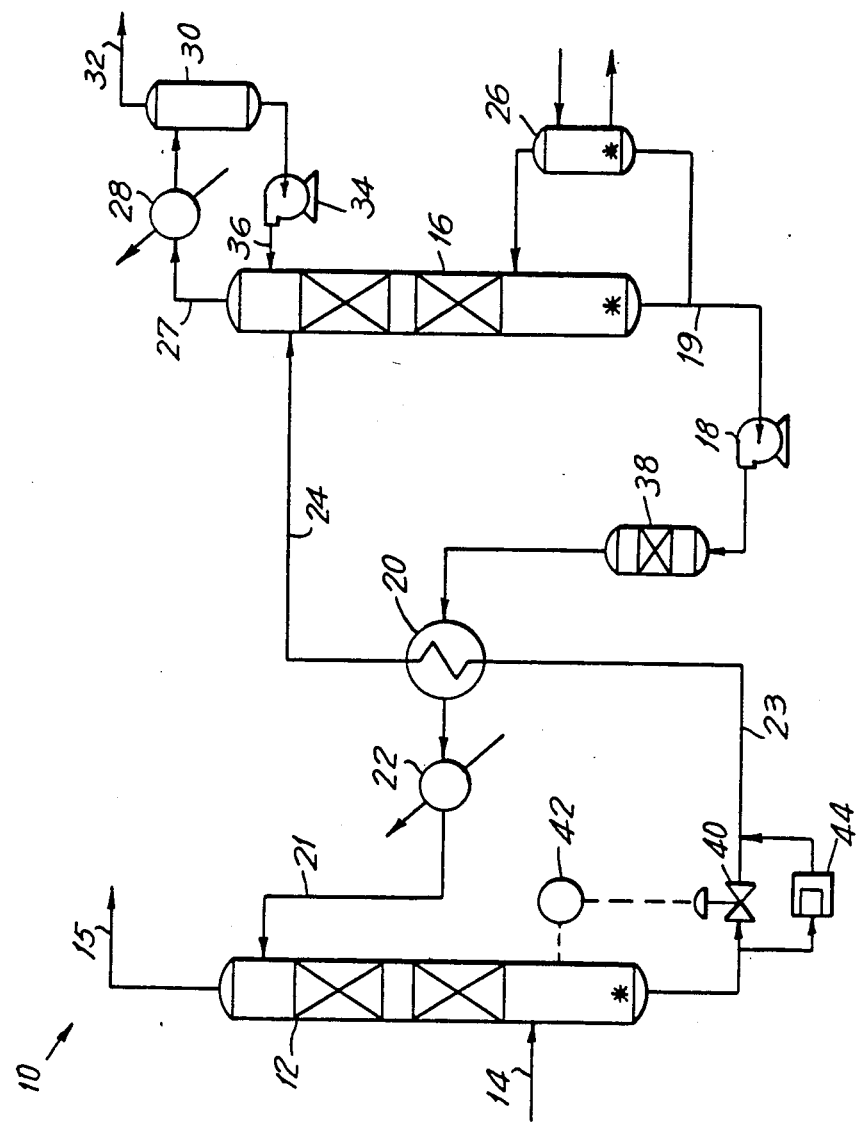

CORROSION INHIBITOR FOR CO₂ ABSORPTION PROCESS USING ALKANOLAMINES

BACKGROUND OF THE INVENTION

Field of the Invention

The present invention relates to compositions useful as corrosion inhibitors in $CO_2$ absorption systems and more particularly to compositions for inhibiting corrosion of metallic surfaces exposed to alkanolamines used in such absorption systems. This invention finds particular usefulness in upgrading systems for removing $CO_2$ from recycled reducing gases used in processes for the direct reduction of iron ore to sponge iron, which may also contain $H_2S$, COS and the like.

Typical gaseous reduction systems for the production of sponge iron are exemplified in U.S. Pat. Nos. 3,765,872; 4,336,063; and 4,428,772. The latter two specifically incorporate $CO_2$ removal units in the disclosed process.

Such $CO_2$ absorption systems are widely known. A general description thereof can be found in the text "Gas and Liquid Sweetening" (Second Edition, April 1977) by Dr. R. N. Maddox, published by John M. Campbell (Campbell Petroleum Series) specifically, Chapter 3 on "Amine Processes".

The need for $CO_2$ absorber units with greater efficiency, longer life, greater capacity, lower operating costs, and the ability to process gas streams containing higher acidic concentrations has caused the industry to recognize the need to increase the concentration of the absorbent, i.e. aqueous alkanolamine. See for example, the first paragraph of U.S. Pat. No. 4,071,470. By increasing the concentration of alkanolamine, greater $CO_2$ absorption per volume of solution can theoretically be achieved. However, there is a corresponding increase in the corrosion of the metallic components of the absorber units, particularly in the reboiler, the absorber column and the associated piping of the regeneration portions of the absorber where the steel is exposed to a hot, protonated alkanolamine solution.

Several alternatives have been suggested by the prior art to minimize the corrosive effects of alkanolamine absorbents in $CO_2$ absorption systems. One suggestion is to use stainless steel or corrosion resistant alloys as materials of construction for the contact surfaces. This, of course, results in prohibitively high capital costs. Another alternative is to provide for a side-stream reclamation still to remove corrosive degradation products thereby exercising greater control over the process conditions. See, for example, Pearce et al., U.S. Pat. No. 4,477,419, Column 1, lines 35-47. Another proposed solution is to add corrosion inhibiting compounds to the absorbing solution to inhibit corrosion and/or the formation of corrosive elements. See, for example, the paragraph in Pearce et al., column 1, at lines 66, et seq. for the use of copper as an inhibitor. See also "Corrosion Control in $CO_2$ Removal Systems", *Chemical Engineering Progress*, Vol. 69, No. 2, February 1973. This article discusses various approaches, some of which are exemplified in the patents discussed below. The specifically disclosed inhibitor has been found not to be very effective in the presence of sulfur.

In contrast, U.S. Pat. No. 4,143,119, Asperger et al., discusses in the first column, the relative ineffectiveness of copper alone as an inhibitor. It then discloses as a corrosion inhibiting composition the combination of "copper ions in the presence of sulfur atoms" (or copper and a sulfur salt plus an oxidizing agent to assure the presence of free sulfur) used in an alkanolamine solution.

Asperger, et al. discloses a series of experiments made with different copper sources and different oxidizing agents combined with $H_2S$. In Table II the use of a zinc permanganate salt is shown with $CuCO_3$ and, separately, with $Cu(NO_3)_2$. This is taught in conjunction as a solution of 80% of monoethanolamine in water saturated with $H_2S$ at room temperature.

Asperger, et al. did not disclose or teach any special inhibiting properties as being attributable to any ingredient beyond copper and effectively free sulfur. The purpose of the experiments in Table II was to test different oxidizers, for example: permanganates, persulfates, peroxides, etc.

U.S. Pat. No. 4,096,085, Holoman Jr.. et al., discloses a corrosion inhibited composition consisting of (1) an amine compound, (2) copper, and (3) sulfur.

U.S. Pat. No. 4,071,470, Davidson et al., discloses a method for inhibiting corrosion of metals in contact with an absorbent inhibiting composition by reacting monoethanolamine, copper, sulfur and an oxidizing agent.

U.S. Pat. No. 1,989,004, Fife, discloses a process for removing sulfur compounds wherein some metals such as copper, iron, nickel and zinc are added to the alkanolamine solution in order to enhance the absorption of sulfur. Fife makes no reference to corrosion problems.

U.S. Pat. No. 3,959,170, Mago, discloses a compound of antimony and vanadium which, when added to the alkanolamine solution, results in corrosion inhibition.

U.S. Pat. No. 2,559,580, Alexander, discloses that iodine must be present in the alkanolamine solution in order to prevent the degradation of the amine in which copper is present.

Some of these are effective in treating sour gases having higher concentrations of $H_2S$ relative to $CO_2$ but are taught as best being effective for gases contaminated only with $CO_2$ (e.g. see Asperger). Others show some improvement over the use of Cu alone as an additive, but require still greater enhancement.

It is an object of the present invention to provide a $CO_2$ removal process which can be used in a plant constructed with less expensive carbon steel and can be operated at higher concentrations of alkanolamine resulting in less energy loss and higher $CO_2$ absorption efficiency.

It is a further object to provide a commercial corrosion inhibitor composition which effectively passivates metallic iron surfaces during normal $CO_2$ plus $H_2S$ scrubbing operations.

It is another object to provide a process for achieving the foregoing objectives with respect to a reducing process gas such as used for the production of sponge iron.

BRIEF DESCRIPTION OF THE INVENTION

The advantages of the present invention are achieved through the addition of effective amounts of copper and zinc ions to the alkanolamine absorbent. Suitable sources of copper include copper metal, copper oxides, copper sulfides or other copper salts. Zinc may be added by means of zinc metal, zinc oxides, zinc sulfides or other zinc salts. Alternatively, bronze or brass, preferably, from inexpensive sources such as turnings or mill scrap, may be placed in contact with the alkanolamine absorbent to provide a continuous source of copper and zinc in solution.

BRIEF DESCRIPTION OF THE DRAWING

In this specification and the accompanying drawing, applicant has shown and described several preferred embodiments of his invention and has suggested various alternatives and modifications thereto, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each as may be best suited to the conditions of a particular use.

The drawing is a simplified diagrammatic illustration of a typical $CO_2$ absorption unit which uses alkanolamine.

DETAILED DESCRIPTION OF THE INVENTION

In one preferred embodiment of this invention, sour reducing gas recycled from a sponge iron reduction reactor and containing approximately 7 to 15% by volume of carbon dioxide and 15-60 ppm hydrogen sulfide (plus 60 to 70% $H_2$, 18 to 14% CO and 3 to 8% $CH_4$) enters the $CO_2$ removal unit 10 (preferably, after passing through a scrubber to adequately cool the gas to a range of about 30° C. to 50° C. to remove any free liquids and/or entrained solids). The sour gas then enters the bottom of the absorber column 12 via pipe 14 and flows upwardly through the absorber in counter-current contact with a cooled aqueous alkanolamine solution. Sweetened treated gas (substantially free of $CO_2$) exits via pipe 15 from the top of the absorber 12. In the sponge iron process of the type disclosed in U.S. Pat. No. 4,428,772 (which is incorporated herein by reference), the sweetened recycle gas from pipe 15 is upgraded with make-up gas, heated, and recycled back to the reduction reactor.

Hot $CO_2$-lean amine solution from the bottom of the stripper column 16 is pumped by pump 18 from pipe 19 through the amine-amine heat exchanger 20 and then through a water or air cooler 22 before being introduced by pipe 21 to the top tray (not shown) of the absorber column 12. The amine moves downwardly through the absorber 12 counter-current to the sour gas, and absorbs $CO_2$ and certain other acid gas constituents, which may be present, from the gas stream introduced from pipe 14. The $CO_2$-rich amine solution then exits from the bottom of the absorber 12 and flows to control valve 40. Valve 40 is actuated by level controller 42, which produces a pressure drop so as to cause a portion of the MEA to pass through the mechanical-and-activated-carbon filters 44. Then the recombined flow successively passes through pipe 23, the amine-amine heat exchanger 20, and pipe 24, on into the top of the stripper column 16. The outlet gas at the stripper is composed of approximately 99% $CO_2$, 0.6% $H_2$, 60 ppmv $H_2S$, 0.3% methane, and 0.1% CO.

The present invention is applicable not only to recycled gases, but also to the treatment of natural gas, flue gas, synthesis gas, and other such gases as are more commonly associated with MEA (monoethanolamine) type $CO_2$ removal units. The preferred unit is capable of removing such other acid gases as $H_2S$, COS, and $CS_2$ in addition to $CO_2$.

The amine-amine heat exchanger 20 serves as a heat conservation device and lowers total heat requirements for the process. A part of the absorbed acid gases will be flashed from the heated rich solution on the top tray of the stripper 16. The remainder of the rich solution flows downwardly through the stripper in counter-current contact with vapor generated in the reboiler 26. The reboiler vapor (primarily steam) strips the acid gases from the rich solution. The acid gases and the steam leave the top of the stripper 16 via pipe 27 and pass overhead through a condenser 28, where a major portion of the steam is condensed and cooled. The acid gases are separated in a separator 30 and sent via pipe 32 for disposal or separate processing. The condensed steam is returned by pump 34 via pipe 36 to the top of the stripper 16 as reflux.

$CO_2$-rich amine solution leaves the bottom of the absorber 12 at a somewhat elevated temperature due to the heat of reaction released when acid gases react with the amine. For this reason the $CO_2$-lean lean amine solution in the amine-amine exchanger 20 is not cooled sufficiently for many processes. The amine cooler 22 serves to lower the lean amine temperature to the 100° F. range. Higher temperatures in the lean amine solution will result in excessive amine losses through vaporization and also lower acid gas carrying capacity in the solution because of temperature effects.

Where the Cu and Zn ions are to be provided by brass or bronze, pieces of this material are contacted with the alkanolamine solution by placing them in a contacting vessel 38, the reboiler and/or the bottom of the stripping and absorbing columns (see the "star" in the drawing denoting these preferred locations).

It has been found that providing bronze or brass turnings in vessel 38 in continuous contact with the MEA solution produces additional advantages, particularly when the treated gas contains sulfur.

Sulfur forms insoluble compounds with copper and zinc ions and said compounds precipitate. Bronze or brass turnings then become a continuous and inexpensive source of copper and zinc ions to maintain the minimum concentration of those ions for adequate protection against corrosion.

Tests of applicant's copper and zinc corrosion inhibitor composition and method were made according to a standard test in the field (see similar tests explained in detail in U.S. Pat. No. 4,143,311 to Asperger, et al.). Prepared test coupons of carbon steel were placed in contact with the monoethanolamine solution at various locations in the $CO_2$ removal unit (including the reboiler, the level control valve in the absorbing column, the solution inlet at the upper part of the stripping column and at the bottom of the absorbing column). These coupons were removed and the corrosion was measured.

RESULTS

The following table tabulates the experiments conducted and the results obtained in a single series of tests on assignee's commercial installation (similar to that disclosed in U.S. Pat. No. 4,428,772). Corrosion is indicated in mils per year (mpy).

| Location of Test Coupon | CORROSION (mpy) | | | |
|---|---|---|---|---|
| | Without Inhibitor | With Copper added as CuO | With Copper zinc added as CuO and $ZnSO_4$ | CuO and $ZnSO_4$ and Bronze Pieces |
| Reboiler | 90.00 | 29.49 | 13.38 | 0 |
| Level Control Valve in Absorbing column | 18.78 | 12.10 | 2.97 | 6.2 |
| Solution inlet at the upper part of the stripping column | 18.11 | 10.88 | 2.64 | 1.74 |
| Bottom of Absorbing Column | 5.27 | 4.05 | 0.25 | 1.08 |
| Concentration of MEA (% WT) | 27 | 24 to 27 | 24 to 27 | 29 to 32 |

In accordance with standard practice, the relatively short duration of the tests requires some extrapolation of the results to give the corrosion figures in terms of mils per year. However, the superior inhibitive effect of the combination of Zn+Cu over Cu alone is adequately shown. Corrosion in the level control valve 40 was reduced 84% with the addition of CuO and $ZnSO_4$. When bronze was added as a source of Cu and Zn ions, corrosion was reduced almost 67% over the use of Cu alone. Even greater reductions were obtained in the stripping column inlet where CuO and $ZnSO_4$ reduced corrosion by 85% over Cu alone and 90% when bronze was added. In the reboiler, corrosion was virtually non-existent when the bronze was used as a source of Cu and Zn ions.

The amine solution may be any of the alkanolamines known in the art to be useful in $CO_2$ removal units, and particularly, includes in the preferred embodiment of the invention, monoethanolamine.

The corrosion inhibited composition of the present invention comprises a solution containing alkanolamine effective for $CO_2$ removal (when used in a unit of the type described) and having copper and zinc ions present in said solution in effective amounts to keep the corrosion of said standard mild carbon steel to less than 7 mpy under typical commercial conditions of use. The concentration of copper and of zinc in said solution, preferably, each ranges from 100 to 500 ppm.

Laboratory tests have established that with from 100 to 500 ppm of copper and 100 to 500 ppm of zinc, the corrosion of mild steel can be kept to a range of under 20 to 1 mpy at concentrations of MEA of 30% to 50% by weight with $CO_2$ loadings of 0.07 to 0.47 for loadings of 1 to 15 ppm $H_2S$.

What is claimed is:

1. In a process for the recovery of carbon dioxide from a feed gas containing the same and at least half of said gas being composed of either hydrogen or carbon monoxide or both which may also contain sulfur compounds, by contacting the gas in ferrous metal processing equipment with a circulating alkanolamine solution containing copper and treating said solution rich in $CO_2$ with heat to release the $CO_2$ thereby producing a lean solution and cooling and returning the so-treated lean solution to the contacting step, the improvement which comprises maintaining a corrosion inhibiting means consisting essentially of copper ions and zinc ions in said circulating solution in an amount effective to inhibit corrosion of the ferrous metal processing equipment and/or degradation of the solvent by bringing said circulating solution into contact with a metal selected from bronze and brass.

2. A process of claim 1, wherein the alkanolamine is a monoalkanolamine.

3. A process of claim 1, wherein the alkanolamine is a monoethanolamine.

4. A process of claim 1, wherein the copper is maintained in solution at between about 1 ppm and about 500 ppm, and said zinc is maintained in solution at between about 100 ppm and about 500 ppm.

5. A process as in claim 4, wherein the alkanolamine is MEA.

6. A process of claim 1, wherein the feed gas is a recycle gas from an iron ore direct reduction reactor.

7. A process of separating carbon dioxide from gaseous mixtures by contacting such gases with an aqueous solution of monoethanolamine, whereby said process inhibits corrosion of ferrous metal surfaces, comprising treating the monothanolamine solution with a composition consisting essentially of a metal selected from bronze, brass, and mixtures of copper and zinc so as to maintain an effective inhibiting amount of dissolved copper and zinc in the monoethanolamine solution.

8. A process of claim 7, wherein the copper is maintained in solution at between about 100 ppm and about 500 ppm, and said zinc is maintained in solution at between about 100 ppm and about 500 ppm.

* * * * *

UNITED STATES PATENT AND TRADEMARK OFFICE
CERTIFICATE OF CORRECTION

PATENT NO. : 4,714,597
DATED : December 22, 1987
INVENTOR(S) : Juan A. Villarreal-Trevino It is certified that error appears in the above-identified patent and that said Letters Patent is hereby corrected as shown below:

On the Title Page:
Correct inventor's surname (BOTH occurrences) on face of patent by replacing "Trevino" with --Villarreal-Trevino-- and by replacing "Juan A. V. Trevino" with --Juan A. Villarreal-Trevino--.

In the Abstract, first line, replace "use" by --are--.

Column 6, line 38 (in claim 7), replace "monothanolamine" by --monoethanolamine--.

Signed and Sealed this

Twelfth Day of July, 1988

Attest:

DONALD J. QUIGG

Attesting Officer

Commissioner of Patents and Trademarks